United States Patent [19]

Merkel

[11] Patent Number: 4,486,149
[45] Date of Patent: Dec. 4, 1984

[54] HEATED LIQUID SYSTEM INTERLOCK

[75] Inventor: Stephen L. Merkel, Bay Village, Ohio

[73] Assignee: Nordson Corporation, Amherst, Ohio

[21] Appl. No.: 472,322

[22] Filed: Mar. 11, 1983

[51] Int. Cl.³ .................... F04B 49/10; B67D 5/08
[52] U.S. Cl. .......................... 417/32; 417/53; 222/54; 222/146.5; 318/472
[58] Field of Search ................ 417/1, 32, 33, 53; 222/54, 146 H, 146 HE; 318/471, 472, 473; 219/421

[56] References Cited

U.S. PATENT DOCUMENTS

| | | | |
|---|---|---|---|
| 3,323,510 | 6/1967 | McIntyre | 222/54 X |
| 3,408,008 | 10/1968 | Cocks | 222/54 X |
| 3,585,361 | 6/1971 | Rosen et al. | 222/146 HE X |
| 3,606,095 | 9/1971 | Kronseder | 222/146 HE |
| 3,662,927 | 5/1972 | Cocks | 222/146 HE |
| 3,668,497 | 6/1972 | Freiberger et al. | 318/472 X |
| 3,746,570 | 7/1973 | McIntosh | 222/146 HE X |
| 3,797,808 | 3/1974 | Ma et al. | 222/63 X |
| 3,824,364 | 7/1974 | Cachat | 222/146 HE X |
| 3,876,105 | 4/1975 | Kelling | 222/146 HE X |
| 3,954,351 | 5/1976 | Scholl et al. | 417/40 |
| 4,022,349 | 5/1977 | McMullan et al. | 222/54 |
| 4,059,466 | 11/1977 | Scholl et al. | 222/146 HE X |
| 4,154,368 | 5/1979 | Gusmer et al. | 222/146 HE X |
| 4,308,447 | 12/1981 | Nötzold et al. | 222/146 HE X |
| 4,437,581 | 3/1984 | Coker | 222/54 |

Primary Examiner—William L. Freeh
Assistant Examiner—Paul F. Neils
Attorney, Agent, or Firm—Wood, Herron & Evans

[57] ABSTRACT

A motor drive for a hot melt adhesive pump is maintained in an inoperative condition until the adhesive has heated sufficiently to permit free operation of the motor. The adhesive is received in a container supported upon a heater which is activated to heat the container and the adhesive therein. The output of a proportional control for the heater, which is responsive to the container temperature, is monitored. The output of the proportional control, when the container temperature is near a set point temperature indicative of a desired heated condition for the adhesive, is an intermittent signal. In one form of the invention, the intermittent signal is electrically integrated to produce an interlock release pulse permitting operation of the motor. In a second form of the invention, a thermal relay is coupled to a source of electrical power through a switching circuit, which permits power to be coupled to the thermal relay during the intermittent off times of the heater. The thermal relay thermally integrates the intermittent power coupled thereto and produces an interlock release signal to permit operation of the motor.

16 Claims, 3 Drawing Figures

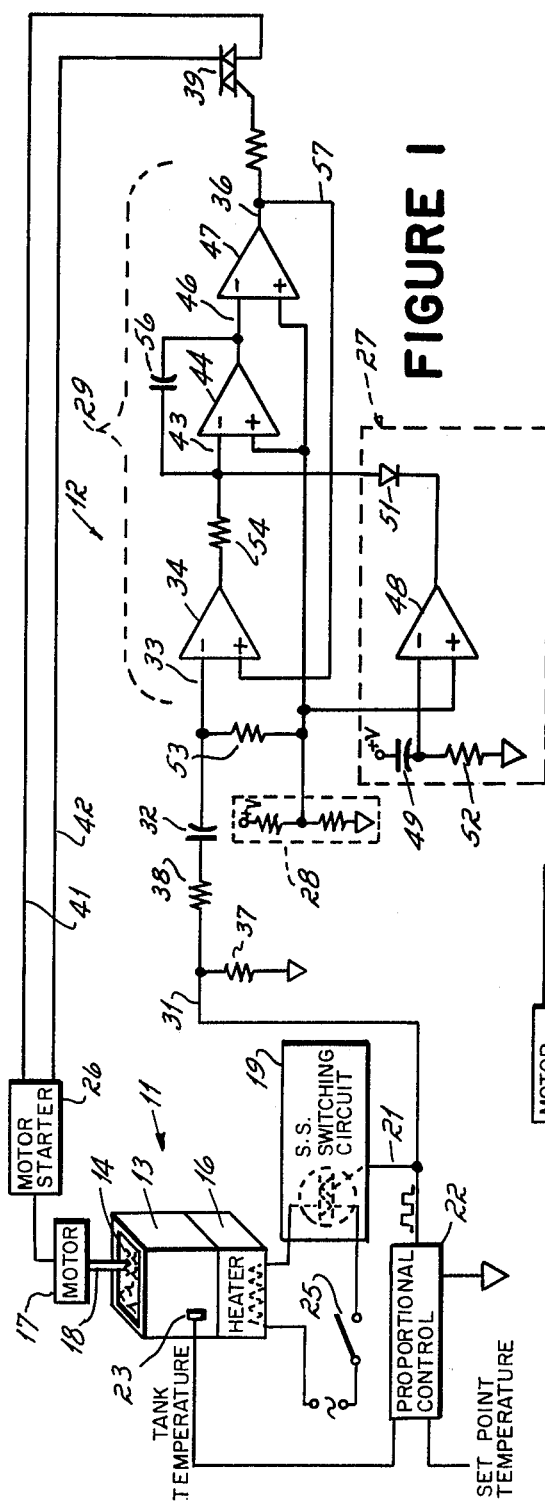
FIGURE 1
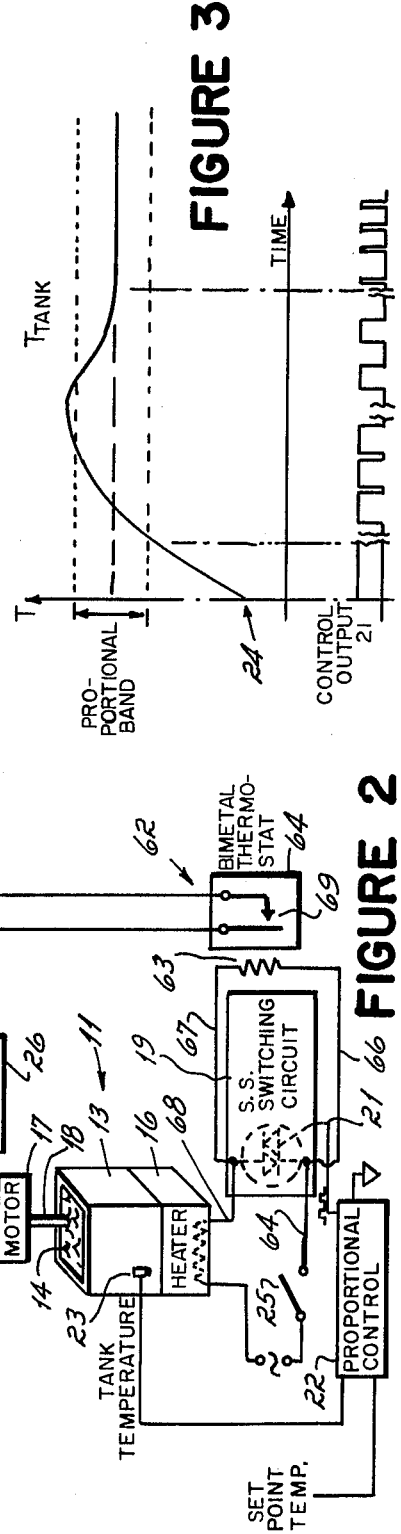
FIGURE 3
FIGURE 2

HEATED LIQUID SYSTEM INTERLOCK

DESCRIPTION OF THE INVENTION

This invention is in the field of systems for acting upon heated liquids and more particularly concerns interlock circuitry for preventing apparatus from acting upon the liquid until the liquid has reached a desired heated condition.

Certain liquids which are handled in commercial processes become extremely viscous or assume a solid form when cooled. Consequently, when working with such liquids, steps must be taken to assure that the liquid has been suitably heated before beginning the process in order to prevent damage to equipment used in implementing the process.

Illustrative of such commercial processes is the application of hot melt adhesive to various substrates. In a typical hot melt adhesive dispensing system, the adhesive is supplied from a heated tank through heated hoses to a dispensing gun. The adhesive flow is provided by a motor-driven gear pump in the tank. When the system is turned off, such as at the end of the day, the adhesive remaining in the tank and the pump reverts to solid form since the heaters are deactivated and the adhesive cools. In order to avoid damage to the pump motor, when the system is subsequently restarted, it is important to prevent activation of the pump-driving motor until after the hot melt adhesive has heated to a sufficiently molten condition in the tank and in the pump. Once the adhesive has melted, and relatively free rotation of the motor shaft is possible, the motor may safely be started.

To assure safe operation of the motor, it has proved to be impractical to measure the temperature of the adhesive in the tank directly using, for example, a direct temperature probe. It has been found, for example, that solidified adhesive around the temperature probe severely affects the accuracy of temperature readings from the probe.

While direct measurement of the hot melt adhesive temperature is impractical, it is still important for proper operation of the pump motor that activation of the motor be prevented until it is known that the adhesive has reached a heated, molten state. It is the general aim of the invention, in systems of the foregoing type for operating upon heated liquids, to provide a safety interlock circuit which prevents operation of a motor or other apparatus from acting upon the liquid until it has reached a workable molten condition.

It has been the practice in heating the components of a holt melt system, such as the adhesive tank, to thermostatically control the heater and to monitor the temperature of the adhesive tank. One type of thermostatic control for the adhesive tank heater is a proportional control, which intermittently applies power to the heater in varying length duty cycles.

As the tank heats up, the heater is activated, on a pulsed basis, for shorter and shorter periods of time. Eventually, the temperature of the tank stabilizes at a set point temperature, requiring occasional pulses of power to be applied to the heater. At this time, the adhesive in the tank has reached an operating temperature which is relatively stable.

It can be appreciated that when the adhesive dispensing system is first turned on, the heater is continuously activated as the tank and the adhesive therein are heated. Once the tank temperature nears the set point temperature, and the adhesive has substantially reached its desired molten state, the proportional control begins to effect intermittent application of power to the heater. Advantageously, in practice in the present invention, this phenomenon is employed to provide an interlock arrangement to prevent activation of the adhesive pump motor until the adhesive is sufficiently heated.

Accordingly, in one embodiment of the invention, intermittent signals produced by the heater control are electronically integrated, and after an integration interval, an interlock release signal is produced and coupled to a pump motor starter circuit to permit the motor to be started.

In another embodiment of the invention, when electrical power is intermittently decoupled from the heater, it is coupled instead to a thermal relay. The thermal relay in turn thermally integrates the intermittent electrical power coupled to it and, after a certain integration period, produces an interlock release signal, permitting operation of the pump motor.

Other objects and advantages of the invention, and the manner of their implementation, will become apparent upon reading the following detailed description and upon reference to the drawings, in which:

FIG. 1 is a diagrammatic representation of a portion of a hot melt adhesive dispensing system in conjunction with an interlock circuit in accordance with the present invention;

FIG. 2 is a diagrammatic representation similar to that of FIG. 1 showing an alternative interlock arrangement; and FIG. 3 is a diagram showing adhesive tank temperature versus time and illustrative proportional control signals at different parts of the temperature curve.

While the invention is susceptible to various modifications and alternative forms, certain illustrative embodiments have been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

With initial reference to FIG. 1, portions of a hot melt adhesive dispensing system 11 which are relevant to the present invention are illustrated, interconnected with an interlock circuit indicated generally as 12. The hot melt adhesive system 11 includes a tank 13 containing adhesive 14 heated by a heater 16. A motor 17 drives a shaft 18, extending into the hot melt adhesive 14, to in turn drive a pump (not shown) in communication with the adhesive in the bottom of the tank. Various other elements of a typical hot melt adhesive dispensing system such as a dispensing gun and a heated hose for carrying adhesive to the gun have not been illustrated.

In order to control the heating of the adhesive 14 in the tank 13, a solid state switching circuit 19 is interposed in series between a source of electrical power and the heater 16. When an on/off switch 25 is closed, the solid state switching circuit 19 is responsive to a control signal on a line 21 to couple the heater to the ac power source, thereby activating the heater. The control signal 21 is produced by a proportional control circuit 22, which compares a set point temperature with the temperature of the tank 13 as measured by a temperature sensor 23.

The operation of the control arrangement including the switching circuit 19 and the proportional control 22 for controlling the application of power to the heater 16 is illustrated in FIG. 3. A proportional control has a proportional band of temperatures within which intermittent control pulses are coupled on the line 21 to the switching circuit 19. If the tank temperature is below the proportional band, the proportional control output signal is continuously on and the switching circuit 19 applies continuous ac power to the heater 16. When the tank temperature is within the proportional band, the proportional control output signal on the line 21 is a pulsed signal, with the duty cycle decreasing as the tank temperature rises within the proportional band. If the tank temperature increases beyond the proportional band of temperatures, the proportional control output signal is removed, and the heater is completely deactivated.

As shown in FIG. 3, when the power switch 25 is closed, the tank begins at an ambient temperature 24 and begins to increase since the heater 16 is continuously activated. The control output 21 at this time remains continuously on.

As the tank temperature moves upwardly through the proportional band, the "on" time of the control output 21 decreases. The tank temperature finally settles at the set point temperature, and the proportional control output 21 pulses the switching circuit with occasional pulses having a relatively short "on" time. The proportional control output pulses 21 shown in FIG. 3 are diagrammatic. The actual pulses typically occur at a high frequency and would not be distinguishable on the actual time scale illustrated for the tank temperature.

Since the adhesive 14 is initially in a solid state, before the heating of the tank 13 and the adhesive by the heater 16, it is necessary to prevent operation of the motor 17 until the adhesive has reached a sufficiently molten condition that the pump in the tank can move and the shaft 18 is free to rotate, to prevent overheating or other damage to the motor 17.

As indicated earlier, it has proved to be impractical to directly measure the temperature of the adhesive 14 in the tank. Consequently, other means must be employed to provide a positive interlock to prevent operation of the motor 17 until the adhesive 14 has reached a sufficient temperature to permit safe operation of the motor.

In the form of the invention illustrated in FIG. 1, this is accomplished by sensing the presence of the intermittent contol pulses on the line 21, integrating the pulses, and, after a certain integration value has been reached, producing an interlock release signal either activating or enabling a starter circuit 26 for the motor 17. In the illustrated form of the invention, the interlock circuit 12 accomplishes these objectives.

The interlock circuit 12 includes a power-up reset portion 27, a bias-establishing circuit 28, and a three-stage operational amplifier switching and integrating circuit 29.

When an intermittent pulse signal is applied on the line 21, indicating that the tank temperature has risen to the proportional temperature band, this pulse signal is also coupled on a line 31 to the interlock circuit 12. The pulse signal is then ac coupled through a capacitor 32 to the inverting input 33 of an operational amplifier 34 in the switching end integrating circuit 29. This pulse signal is integrated by the circuit 29 to produce an output 36, which fires a triac 39 and enables the motor starter circuit 26 to energize the motor 17.

In the operation of the interlock circuit 12, the output 36 of the switching and integrating circuit 29 is maintained at a logic low until the motor interlock is to be released. When the output 36 goes high, the triac 39 is turned on. This closes an electrical circuit path between the lines 41 and 42, and this switch closure is used by the motor starter 26 as an interlock release signal, such as to start the motor or enable a manual motor start switch.

When the system, including the interlock circuit 12, is first powered up, a logic low is impressed upon the inverting input 43 of the integrator amplifier 44, forcing its output 46 high. This output 46 is the inverting input to the amplifier 47, which thereby forces the amplifier output 36 low, maintaining the triac 39 in a turned-off condition.

In order to produce the power-up reset, an amplifier 48 has its inverting input coupled to the dc supply through a capacitor 49. The non-inverting input of the amplifier 48 is coupled to a small positive reference voltage, which is supplied from the divider network 28. This same low voltage reference is also supplied to the non-inverting inputs of the amplifiers 44 and 47.

Upon power-up, substantially the full supply voltage is applied to the inverting input of the amplifier 48, while the substantially lower reference voltage is applied to its non-inverting input. The output of the amplifier is driven low, and consequently the inverting input 43 of the integrator-amplifier 44 is driven low. Since the non-inverting input to the amplifier is at a low positive value, the amplifier output 46 goes to a logic high. The logic high at 46 is input to the inverting input of the amplifier 47, whose non-inverting input is coupled to the low positive reference voltage, and the amplifier output 36 is driven low. This keeps the triac 39 turned off.

The output of the amplifier 48 is coupled to the switching and integrating circuit 29 through a diode 51 so that the power-up reset circuit 27 will have no effect upon the balance of the circuitry after the reset interval. After power-up, the capacitor 49 discharges through a resistor 52 to the circuit common, the output of the amplifier 48 goes high, and the diode 51 prevents the power-up reset circuit from having any further effect until the next reset.

As indicated, after reset, the output 36 of the amplifier 47 is low, and this low is coupled back to the non-inverting input of the amplifier 34. The inverting input of the amplifier 34 is coupled through a resistor 53 to the low positive reference voltage output of the circuit 28. Consequently, the output of the amplifier 34 is held low, the output of the amplifier 44 is high, and the output of amplifier 47 is low. The circuit 29 remains in this condition until the application of pulses through the capacitor 32. Therefore, during the heating of the tank, when its temperature is below the proportional band and the control output 21 is continuously on rather than pulsed, no interlock release signal is produced by the interlock circuit 12.

Once the proportional band of temperatures is reached, the proportional control output 21 begins to pulse. These pulses are coupled through the capacitor 32 and scaled by the circuit resistances, including the resistors 37 and 38, to produce pulses at the inverting input 33 of the amplifier 34. The output of the amplifier 34 is then a series of pulses, which are coupled through a resistor 54 to the inverting input of the integrating amplifier 44. The level of the output 46 of the amplifier 44, which has been held high, moves downwardly as the pulses are integrated, with the rate of integration determined by the resistor 54 and a feedback capacitor 56.

When the output 46 of the integrator falls below the reference level bias applied to the non-inverting input of the amplifier 47, the amplifier output 36 switches to a logic high, activating the triac 39. Due to the feedback line 57 from the output of the amplifier 47 to the non-inverting input of the amplifier 34, the circuit 29 is thereafter locked in an interlock release condition until the next deactivation of the system. The presence or absence of pulses coupled through the capacitor 32 has no further effect upon the circuit.

In one form of the invention, the integration time provided by the resistor 54 and the capacitor 56 is several seconds. Therefore, in this case, a significant delay is not introduced in producing an interlock release signal once the tank temperature has entered the proportional band. The interlock circuit 12 does assure, however, that the proportional band has in fact been entered. The interlock circuit 12 will ignore short durations of spurious pulses which might appear at the proportional control signal output 21.

While the form of the invention illustrated in FIG. 1 has been described in connection with a hot melt adhesive tank and a safety interlock circuit for a pump motor acting upon the adhesive in the tank, it will be understood that the invention also applies, for example, to other, analogous safety interlock systems for the dispensing of hot melt adhesives. For instance, a similar thermostatic control arrangement could be used for a heated adhesive-dispensing gun, with the interlock circuit 12 preventing operation of the gun until the adhesive in the gun has been properly melted as indicated by the gun temperature. In fact, containers for the adhesive are contemplated other than a tank or gun, such as a heated adhesive hose or a heated hopper for solid adhesive.

Further, while the particular control 22 illustrated is a proportional control, other types of pulsed control circuits could be interfaced with the interlock circuit 12 with satisfactory results. The important factor is that an intermittent pulsed output be produced at a time when the adhesive container is sufficiently heated that the adhesive therein is in a workable molten state.

Referring now to FIG. 2, the illustrative hot melt adhesive system 11 is shown, with common elements bearing the same reference numerals as those of FIG. 1. In the form of the invention of FIG. 2, a thermal integrator interlock circuit 62 is interconnected with the hot melt dispensing system 11 in order to provide an interlock release signal to the motor starter 26. The interlock circuit 62 is not coupled to the proportional control output 21, but is instead coupled to the solid state switching circuit 19. When the system power switch 25 is closed, the control signal 21 is continuously on, continuously activating the switching circuit 19 to couple ac power to the heater 16. When the temperature of the tank reaches the proportional band, intermittent control pulses are then applied to the switching circuit 19, and the switching circuit intermittently opens the circuit coupling the ac power to the heater. Whenever this circuit is open, a heating element, a resistor 63, adjacent a bimetal thermostat 64 is connected in series with the heater across the ac power source. The circuit connection is from one side of the ac power source through the switch 25, the line 64, the line 66, the resistor 63, the line 67, the line 68, and the heater 16 to the other side of the ac power source. The resistor 63 has a very high resistance compared to that of the heater 16, and substantially all of the voltage from the ac source is dropped across the resistor 63. Thus, the heater 16 is intermittently substantially off, and the resistor 63 is intermittently energized by the ac power source. The resistor 63 cooperates with the bimetal thermostat 64 to form a thermal relay, which thermally integrates the intermittent removal of power from the heater. After several seconds, or more depending upon the physical construction of the thermal relay, the switch 69 closes due to the heating of the resistor 63, providing an interlock release signal to the motor starter 26 in the same fashion as firing the triac 39 in the circuit of FIG. 1.

In both the circuit of FIG. 1 and the circuit of FIG. 2, the particular implementation of the motor starter circuit 26 has not been illustrated in detail. The circuit 26 is not critical since a variety of means may be employed for responding to the closure of the switch 39 or the switch 69 in order to release a motor interlock.

What is claimed is:

1. A system for acting upon a heated liquid when the liquid has reached a desired condition comprising:

a container for the liquid;

a heater adjacent the container operable, when activated, to heat the container and the liquid therein;

a temperature sensor at the container for sensing the temperature of the container;

control means coupled to the temperature sensor for intermittently activating the heater when the container temperature is near a set point temperature indicative of a desired heated condition of the liquid, the control means producing at an output an intermittent electrical signal when the heater is intermittently activated;

means for intergrating the output of the control means;

means responsive to the condition of the integrating means to produce an interlock release signal;

a motor-driven pump for acting upon the liquid when the motor-driven pump is energized; and means, responsive to the interlock release signal, for energizing the motor-driven pump.

2. The system of claim 1 in which the heated liquid is a hot melt adhesive.

3. A system for acting upon a heated liquid when the liquid has reached a desired heated condition comprising:

a container for the liquid;

a heater adjacent the container operable, when activated, to heat the container and the liquid therein;

a temperature sensor at the container for sensing the temperature of the container;

control means coupled to the temperature sensor for intermittently activating the heater when the container temperature is near a set point temperature indicative of a desired heated condition of the liquid, including a control circuit producing intermittent control pulses when the container temperature is near the set point temperature and means for intermittently activating the heater in response to said intermittent control pulses;

means coupled to said intermittent control pulses for electrically integrating said pulses and having an output;

electrical circuit means coupled to the output of the integrating means and responsive thereto to produce an interlock release signal;
a motor-driven pump for acting upon the liquid when the motor-driven pump is energized; and
means, responsive to the interlock release signal, for energizing the motor-driven pump.

4. The system of claim 3 in which the heated liquid is a hot melt adhesive.

5. The system of claim 3 in which the means for electrically integrating pulses comprises an operational amplifier having a feedback capacitance.

6. The system of claim 5 in which the electrical circuit means coupled to the output of the integrating means includes an output operational amplifier coupled to the output of the integrating means whose output is coupled to an electronic switching device.

7. The system of claim 6 in which the electronic switching device is a triac.

8. The system of claim 7 in which the electrical circuit means coupled to the output of the integrating means further comprises an input operational amplifier coupled between the intermittent control pulses and the integrating means, there being a feedback loop between the output of the output amplifier and an input of the input amplifier.

9. The system of claim 8 which further comprises a reference level producing circuit for coupling a reference voltage to an input of the integrating amplifier and an input of the output amplifier.

10. The system of claim 9 in which the feedback capacitance of the integrating amplifier is coupled to its inverting input and further comprising a power-up reset circuit for coupling a reset pulse to the inverting input of the integrating amplifier.

11. The system of claim 10 in which the heated liquid is a hot melt adhesive.

12. A system for acting upon a heated liquid when the liquid has reached a desired heated condition comprising:
a container for the liquid;
a heater adjacent the container operable, when activated, to heat the container and the liquid therein;
a temperature sensor at the container for sensing the temperature of the container;
control means coupled to the temperature sensor for producing intermittent control pulses when the container temperature is near a set point temperature indicative of a desired heated condition of the liquid and an electrical switching circuit coupled to an electrical power source and responsive to said intermittent control pulses to couple electrical power intermittently to the heater;
a thermal relay including,
a heating element coupled to the electrical switching circuit, the switching circuit being operable to couple electrical power to the heating element intermittently in response to the intermittent control pulses and
a thermostatic switch adjacent the heating element operable to produce an interlock release signal when the heating element has reached a certain temperature level;
a motor-driven pump for acting upon the liquid when the motor-driven pump is energized; and
means, responsive to the interlock release signal, for energizing the motor-driven pump.

13. The system of claim 12 in which the heated liquid is a hot melt adhesive.

14. The system of claim 12 in which the switching circuit is operable to couple electrical power to the heating element intermittently when power is not coupled to the heater.

15. The system of claim 14 in which the heated liquid is a hot melt adhesive.

16. A method for preventing a motor-driven pump from acting upon a heated liquid in a container until the liquid has reached a workable molten temperature comprising the steps of:
heating the container and the liquid therein;
sensing the temperature at the container;
controlling the activation of the heater so that when the container temperature is near a set point temperature indicative of a desired heated condition, the heater is intermittently activated and producing an intermittent electrical signal when the heater is intermittently activated;
integrating said intermittent output;
producing an interlock release signal after a period of integration of the intermittent signal; and
energizing a motor-driven pump to act upon the heated liquid after the production of the interlock release signal.

* * * * *

UNITED STATES PATENT AND TRADEMARK OFFICE
CERTIFICATE OF CORRECTION

PATENT NO. : 4,486,149
DATED : December 4, 1984
INVENTOR(S) : Stephen L. Merkel

It is certified that error appears in the above-identified patent and that said Letters Patent is hereby corrected as shown below:

Column 6, line 24, after "desired," insert -- heated --

Column 7, line 46, after "for," insert -- intermittently activating the heater, including means for --

Signed and Sealed this

Twenty-third Day of July 1985

[SEAL]

Attest:

DONALD J. QUIGG

Attesting Officer     Acting Commissioner of Patents and Trademarks